United States Patent [19]

Lalikos

[11] Patent Number: 5,143,409
[45] Date of Patent: Sep. 1, 1992

[54] STRESS RELIEF DEVICE

[75] Inventor: Anthony J. Lalikos, Springfield, Mass.

[73] Assignee: Titeflex Corporation, Springfield, Mass.

[21] Appl. No.: 548,513

[22] Filed: Jul. 10, 1990

Related U.S. Application Data

[63] Continuation-in-part of Ser. No. 400,325, Aug. 30, 1989, abandoned.

[51] Int. Cl.⁵ ............................................. F16L 35/00
[52] U.S. Cl. .................................. 285/116; 285/114; 285/115; 285/235
[58] Field of Search ................. 285/45, 114, 115, 116, 285/235, 236, 417, 418

[56] References Cited

U.S. PATENT DOCUMENTS

| | | | |
|---|---|---|---|
| 1,367,246 | 2/1921 | Ewald | 285/116 |
| 1,587,327 | 6/1926 | Johnson | 285/116 |
| 1,801,403 | 4/1931 | White | 285/116 |
| 1,981,777 | 11/1934 | Brinkman | 285/116 |
| 2,236,731 | 4/1941 | Oberly | 285/115 |
| 2,516,583 | 7/1950 | Moore | 285/114 |
| 2,525,662 | 10/1950 | Freeman | 285/115 X |
| 2,998,259 | 8/1961 | Houghton | 285/236 X |
| 3,578,026 | 5/1971 | Meyer, Jr. | 138/110 |
| 3,578,028 | 5/1971 | Roberts | 138/123 |
| 3,730,564 | 5/1973 | Bachle et al. | 285/115 |
| 3,784,236 | 1/1974 | Slocum | 285/115 X |
| 4,320,783 | 3/1982 | Neal et al. | 138/110 |
| 4,489,961 | 12/1984 | Laidig | 285/116 |
| 4,509,877 | 4/1985 | Sobin et al. | 285/114 X |
| 4,737,210 | 4/1988 | Dougherty | 156/148 |
| 4,778,105 | 10/1988 | Cholkeri et al. | 285/115 X |
| 4,791,963 | 12/1988 | Gronert et al. | 138/110 |
| 4,794,957 | 1/1989 | Metzler, Jr. | 138/109 |
| 4,858,967 | 8/1989 | Tremoulet, Jr. et al. | 285/331 X |

FOREIGN PATENT DOCUMENTS

| | | | |
|---|---|---|---|
| 115465 | 12/1929 | Austria | 285/114 |
| 654030 | 10/1964 | Belgium | 285/115 |
| 821629 | 11/1951 | Fed. Rep. of Germany | 285/116 |
| 595135 | 12/1947 | United Kingdom | 285/235 |

Primary Examiner—Randolph A. Reese
Assistant Examiner—Jeffrey L. Thompson
Attorney, Agent, or Firm—Louis Bernat

[57] ABSTRACT

A dynamic stress relief device for a hose having an end fitting with an end collar that receives, circumferentially surrounds, and secures the hose to the fitting. The stress relief device has a mechanism which changes the combined spring moment density of the hose over the length of the device. The length of the device is in the range of three to twenty times the diameter of the hose. The design is specifically for use on hoses subject to high frequency, high cycle, reversing linear or rotary flexing which may lead to fatigue and hysteresis loss. While the invention may find use in many dynamic environments, it is especially useful in the hydraulic brake line of a vehicle.

22 Claims, 5 Drawing Sheets

STRESS RELIEF DEVICE

This a continuation-in-part of U.S. application Ser. No. 07/400,325 filed Aug. 30, 1989 now abandoned.

This invention relates to hose couplers for joining flexible hoses to stationary members and more particularly to stress relief and distribution for reducing fatigue of the hose in the area of such joining.

For convenience of description, the following disclosure refers specifically to an automobile brake line of small diameter with a rigid end fitting which must pass the "Whip Tests" set forth in the SAE handbook for convenience of expression, such a hose may be described herein as being a "kinetic hose" which can withstand large displacement vibrations occurring at a high frequency. However, it should be understood that the invention also applies to many other applications. Thus, a reference to a brake line is not to be construed as necessarily limiting the invention thereto.

Many flexible conduits, hoses, cords, wires, and the like are adapted to be connected to stationary objects. A common problem encountered by each of these connections is that the flexing of the conduits, hoses, etc. follows a repeating pattern which tends to concentrate material fatigue in such a manner that the conduit, hose, cord, wire, etc., may break and an early failure may occur. For example, electrical cords for such things as irons, toasters and the like have coiled springs or molded rubber sleeves around them at and in the vicinity of a plug. However, these kinds of devices are quite unsophisticated and do little more than to cause the cord to bend around a larger radius, perhaps with some random differences in the individual bending episodes. Conduits, hoses and the like present other problems since it is not only necessary to protect against fatigue, but it is also necessary to protect against kinking, crimping, sudden pulse-like increase or decrease of internal pressure, and the like. For extremely hostile flexing environments such as road hazards, aircraft, brake lines, etc., the unsophisticated stress relief devices may add relatively little service life.

On the other hand, the invention increases the life to these devices many fold. In one example where a stress relief device, constructed according to the invention, was placed on a brake line and tested by the SAE "Whip Test" procedure, the hose survived 1,824,000 bend cycles without failure. The same type of hose was tested in the same manner but without the inventive stress relief, with a result that a failure occurred after less than 48,000 bend cycles. On this basis, it is thought that it would be reasonable to believe that the flex fatigue cycle life of a hose is improved by a factor of about "40" when the inventive stress relief is provided.

In some specialized devices, there are even more severe tests to be met. For example, a fuel line hose for an aircraft has a need for a similar kind of stress relief. However, in an aircraft the weight requirements are such that for every pound of added weight, the weight of the supporting structure, power plant, etc. must be multiplied many times. Thus, if a pound of stress relief must be added to the fuel line hose, perhaps as much as 5 to 10 pounds must be added to the weight of the wing spars, landing gear, engine, and the like. In addition, the increased weight adds cost for fuel and a reduction in the operating range of the aircraft on every flight. Yet a fatigue ruptured aircraft fuel line is about the greatest danger on can imagine.

A stress relief device should be adaptable to an incorporation into an assembly of the hose and end fitting without a substantial amount of specialized construction. The stress relief should extend over as much of, but no more than, the length of a hose as may be required. A less than adequate amount of protection would lead to failure. More than an adequate amount would lead to excess weight and cost, as well as possible failure.

Other considerations relate to the nature of vibrations and flexing that may occur. For example, each of an automobile, truck, a propeller driven aircraft, a helicopter, and a jet powered aircraft has a different vibrational pattern and response frequency. An aircraft with a short range requiring many takeoffs and landings may experience more fatigue than a long range aircraft with fewer takeoffs and landings. The extreme temperature differences between a hot jet engine and the cold six-mile high altitude cause an extreme stress. The number and continuous or intermittent nature of flex cycles is an important consideration. Longer hoses flex over one radius while shorter hoses flex over another radius. Thus, a stress relief device should work a wide range of allowable flexing patterns.

Previous stress relievers were designed to protect against a static bending situation, such as with a gasoline pump hose, which may be stretched to its limit and then held in a static position. Under such conditions, a device need not be sophisticated or even optimized because the physical abuse which it must endure is not very great. However, the invention is designed to endure a high-cycle, high frequency or continuous, rotary or reversing linear dynamic flexing of the hose, which would create tremendous amounts of fatigue and hysteresis loss.

In addition to stress relief, it is desirable to provide a number of secondary advantages. Exemplary of such advantages are strain relief and abrasion resistance. (Stress relief relates to bending; strain relief relates to pulling.) These advantages are especially important in places where the hose might experience excessive mechanical wear. For example, a radiator hose is sometimes near a fan belt. As the fan belt changes speed, it might develop a sudden and momentary flutter which could slap against the hose. The strain relief provided by the invention prevents this slapping action from pulling the hose off the radiator end fitting. The abrasion resistance keeps the hose from being worn thin by the slap of the fluttering belt.

Accordingly, an object of the invention is to provide new and improved stress relief for hoses and similar devices, especially near end fittings. Here, an object is to provide stress relief designs which are suitable to both metal and non-metal construction. In particular, an object is to provide a means for achieving a balance between resilience and stiffness in order to achieve an optimization for any given application Another object of the invention is to provide stress relief with secondary advantages such as strain relief and abrasion resistance.

Yet another object of the invention is vibration absorption. Where required, materials of construction may be selected which absorb a range of vibration frequencies, thereby decreasing the energy the hose experiences.

Still another object is to increase the range of flexing so that the stress relief may be optimized for different applications.

In keeping with an aspect of the invention, these and other objects are achieved by any of various resilient stress relief means which are distributed over a restricted length of the hose at and near the end fitting. The resilience of the stress relief means is varied along the length thereof in order to more precisely control the flexing of the hose. The stress relief may be attached to the end fitting by any suitable means such as adhesion, clamping, friction, latch, chemical or heat fusion.

Preferred embodiments of the invention are shown in the attached drawings in which:

FIG. 13 is a representation of a hydraulic line of a large construction machine, or the like;

The various resilient stress relief distributor spring means shown in FIGS. 1-7 provide alternatives for accommodating such things as resistance to chemicals, heat, light, sun, weather, and similar environmental conditions. Some of the materials which may be selected for the stress relief devices (depending upon these and similar conditions) are steel, stainless steel, spring copper, titanium, nylon, vinyl, styrene, Teflon, polypropylene, polyester, epoxy, glass compositions and carbon fibers. Regardless of the material selected, it must have mechanical resilience and provide support for the outside diameter of the hose during flexing.

Each of the FIGS. 1-7 shows an end fitting 20 coupled to the end of a hose 22 in any suitable manner. The end fittings 20 have a rigid insert member which slips into and continues for a distance from the end of the hose 22, thereby creating a rigid section which does not bend. A vertical line 24, representing the end of the insert, indicates the length of this insert member in each of the FIGS. 1-7 and further indicates a junction between the area of the hose that is made rigid by the insert and the flexible hose extending beyond the junction. The remainder of the stress relief (point 24 to point 25) is the stress distributor part of the device. Its function is to distribute the bending over a large area to prevent both localized material fatigue and a kinking of the hose.

Figure 1:
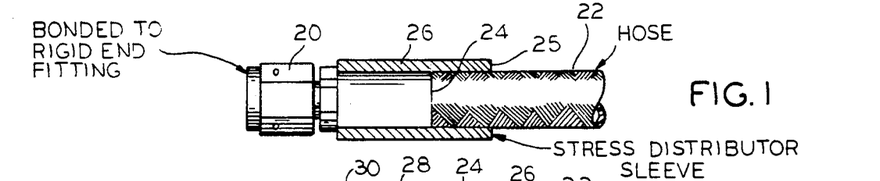
FIGS. 1-7 are side elevations, partly showing in cross-section, of a number of stress relief distributor members mounted on hoses and end fittings, which are not in cross-section.

In FIG. 1, the resilient stress relief member 26 is a tube of material which, in effect, increases the wall thickness of the hose material in the area of distributed flexing. Still, some small amount of slippage may be possible and preferred between the inside surface of sleeve 26 and outside surface of hose 22. Therefore, the hose and the sleeve are free to bend at slightly different radiuses. A bonding between the hose and sleeve may be desirable over some or all of the distance between points 24 and 25 to give a controlled amount of flexing.

Figure 2:
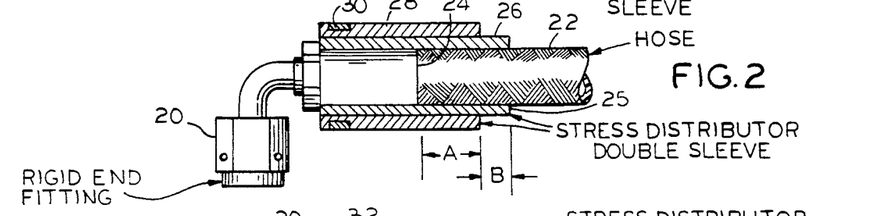

In FIG. 2, a plurality of co-axial sleeves 26, 28 of different length are slipped over the end of the hose 22. The inner sleeve 26 is longer than the outer sleeve 28, which is the shortest. If more sleeves are provided, they are arranged in the order of their length. Therefore, by the use of two sleeves in a first region A, near the end fitting 20, the hose is made stiffer than it is in a second region B, where a single sleeve is used in an area which is more remote from the end fitting region. Clamp 30 holds the hose and sleeves in place.

Thus, in region A, two (or more) sleeves control the bending. In region B, only one sleeve controls the bending. Preferably, there is no bonding at the interfaces between the hose 22 and sleeve 26 or between the two sleeves 26, 28. However, bonding or bonding at specific selected locations may be used to provide varying degrees of flexibility. Without bonding, each member (hose and sleeve) may bend around a slightly different radius. With selective bonding, unique effects may be provided.

Figures 3, 4, 5:
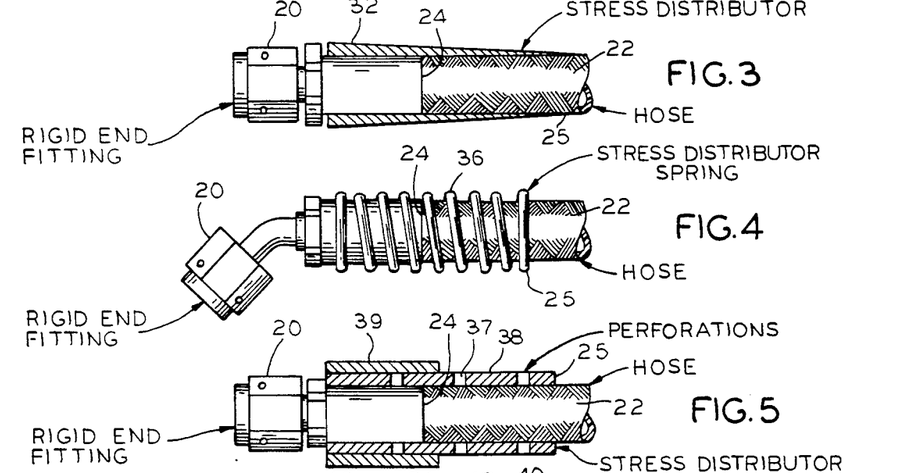

In FIG. 3, the sleeve 32 is tapered in cross-section to provide a gradual diminishing of the stress relief action. There is much less tendency to bend near the end 24 of the end fitting insert than there is to bend at the end 34 of the stress relief sleeve. The taper is here shown as a simple wedge. However, there may be other tapers, such as an exponential curve, for example.

FIG. 4 shows a spring stress distribution device integrally bonded to the hose, wherein variations in coil pitch, wire diameter, and coil diameter may be controlled to distribute the bending forces acting upon the hose 22.

FIG. 5 shows an elastomer sleeve 38 which is perforated (as at 37) to change its bending characteristics. By placing the perforations closer together, the sleeve 38 is made more flexible. By placing the perforations further apart, the sleeve 38 is made less flexible. This feature may be combined with the features of FIG. 2 by adding one or more sleeves 39 which overlay the perforated sleeve 38 to give substantially more thickness in some areas nearer the end fitting.

Figures 6, 7:
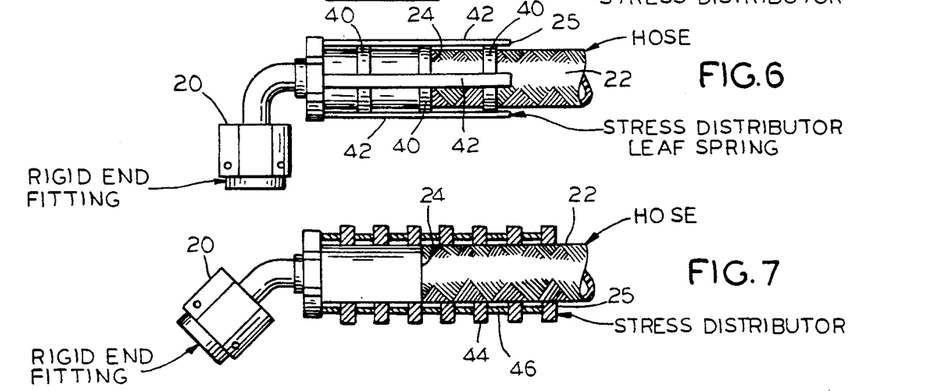

In FIG. 6, a number of spaced apart retainer rings 40 surround the hose. Preferably spot welded to the retainer rings are a plurality of leaf springs 42, which extend parallel to the axis of the hose. If the retainer rings are placed closer together, there is a greater resistance to bending. If they are placed further apart, there is a lesser resistance to bending.

FIG. 7 shows a plurality of rings 44, 46 which are threaded over the hose. As here shown, there are two different types of rings which alternate with each other. However, it should be understood that any number of different types of rings may be used; or, various types of rings may be placed in any suitable order. The rings are preferably elastomers which may vary in thickness, diameter, and durometer in order to vary the bending characteristics.

Thus, in each of these examples of stress distribution devices, there is a progressively greater degree of flexibility toward the outer end 25 of the sleeve, as compared to the degree of flexibility nearer the end fitting 20. In each of these examples, there is a mechanism for incrementally varying the response to bending forces along the length of the hose. The stress relief mechanism might act in an analog manner, as with the tapered sleeve of FIG. 3, for example. Or, the mechanism might act in a digital manner, as with the perforations of FIG. 5, for example. In the example of FIG. 5, there is an added sleeve, and in FIG. 6, there is a combination of retainer rings. In each of these examples, perforations 37 or retainer 40 provide digital increments of flexibility, while the overlaying sleeve 37 or leaf springs 42 act as analog devices.

Figure 8:
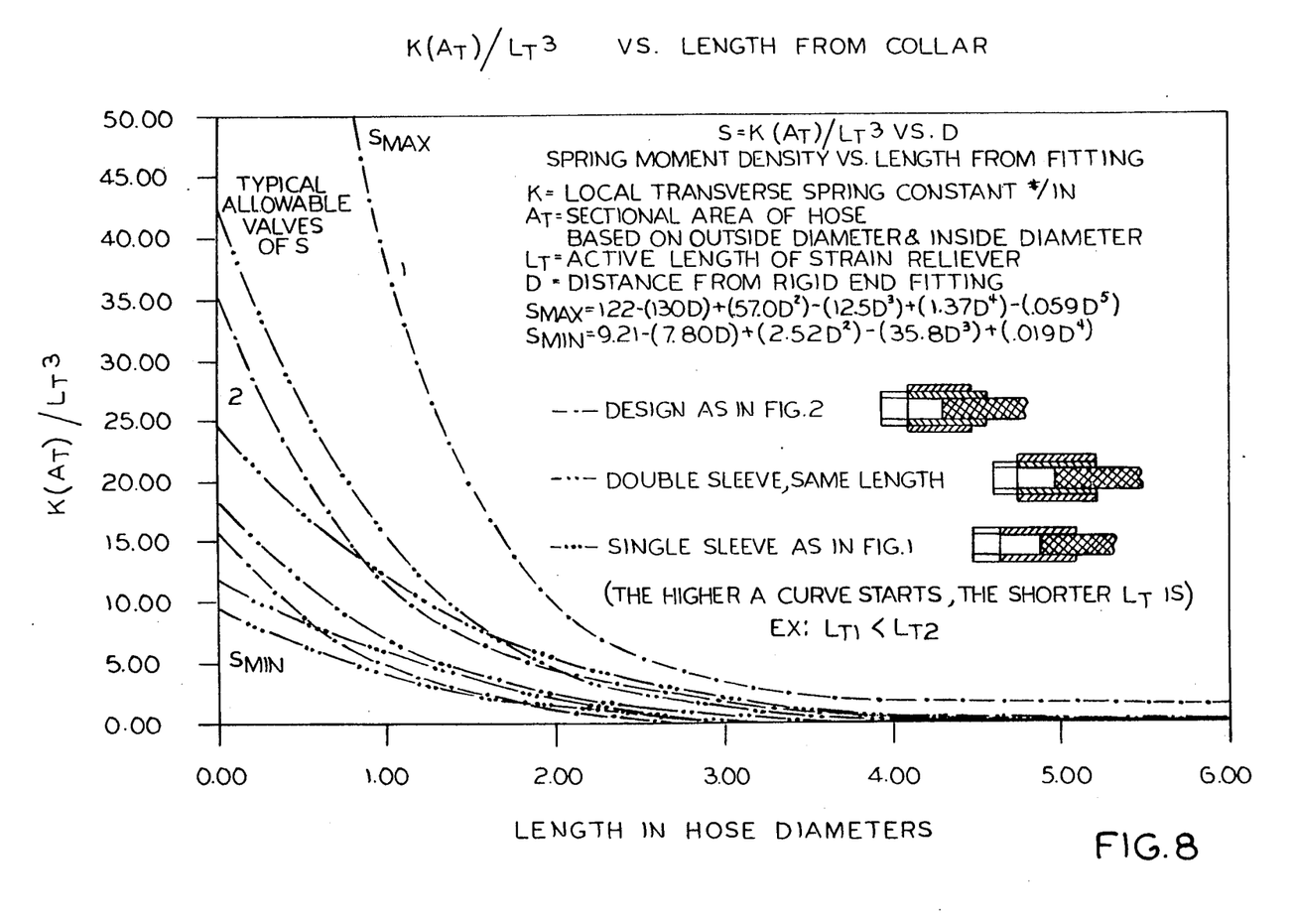
FIG. 8 is a graph which shows how the resilience of the stress relief is distributed along the length thereof.

The principle which is used to select and design the distribution of stress relief response to the bending forces is explained by the graph of FIG. 8. In this graph, the horizontal axis is distance measured in terms of the numbers of diameters of the hose. The vertical axis is a combined spring moment density, for the stress reliever and conduit. The curves describe a resistance to bending over the length of the hose, defined as $S = K_D (A_T)/L_T^3$ vs. D, where:

$K_D$ = the local transverse spring constant at any point "D" along the length of the hose;

$A_T$ = the sectional area of the hose (i.e., the area of the inside diameter subtracted from the area of the outside diameter) at the point where K is taken;

$L_T$ = the active length of the stress relief part; and the distance from the rigid end fitting.

D = the distance from the rigid end fitting.

The operating range of the spring moment density of the inventive device coupled to a hose conforms to the following parameters:

At a distance of one hose diameter along the hose, measured from the point of attachment between the flexible hose and the rigid end fitting, the spring moment density of the hose coupled with the inventive device falls in a range of not less than about 4 and not greater than about 38.

At a distance of two hose diameters along the hose, measured from the point of attachment, the spring moment density of the hose coupled with the inventive device falls in the range of not less than about 1 and not greater than about 10.

At a distance of three hose diameters along the hose, measured from the point of attachment, the spring moment density of the hose coupled with the inventive device falls in the range of not less than about ½ and not greater than about 3.

The preferred ranges are:

At one diameter the spring moment density is approximately from 5 to 15.

At two diameters the spring moment density is approximately from 2 to 5.

At three diameters the spring moment density is approximately from ½ to 1.

Even if an inventive device coupled to a hose matches the above specifications, it must have excellent fatigue resistance; be able to withstand millions of continuous high frequency flexing cycles at 800 RPM, without any degradation; and have good temperature resistance, able to withstand temperatures which vary over a very wide continuous range, without any appreciable degradation.

The family of curves range from a maximum $S_{MAX}$ to a minimum $S_{MIN}$, as defined on the drawing. The preferred range for any particular application depends on design objectives such as:

Maximum abrasion resistance would cause a design high in the range.

Minimum weight would cause a design low in the range.

Maximum service life would cause a design centered in the range.

Once a desired characteristic curve is chosen on the graph in FIG. 8, it is possible to choose the material and calculate the ideal dimensions of the stress distributor sleeve for any application. This allows the stress reliever to be designed more precisely and accurately, and in a fraction of the time that would be required by a trial and error method which could produce a more unsophisticated device.

The stress relief may extend along the length for a distance which is not less than three times the outside diameter or more than twenty times the outside diameter of the hose.

It has been found that the braid on a hose presents a problem which is totally different from the problem which a conduit, hose, or the like presents. In the case of the hose, the problem is to permit bending which gradually increases in curvature, as a function of the increase in the distance outwardly from the end fitting. With the braid, the problem is that the local bending at the point of mechanical attachment causes the braid to become fatigued.

It should be recalled that a rigid insert is placed inside the tube, extending up to the line 24 (FIG. 1). In this section, the conduit, hose, or tube cannot bend. This is the area where the braid suffers most because there is almost certainly a high local bending at the edge 24.

Figure 9:
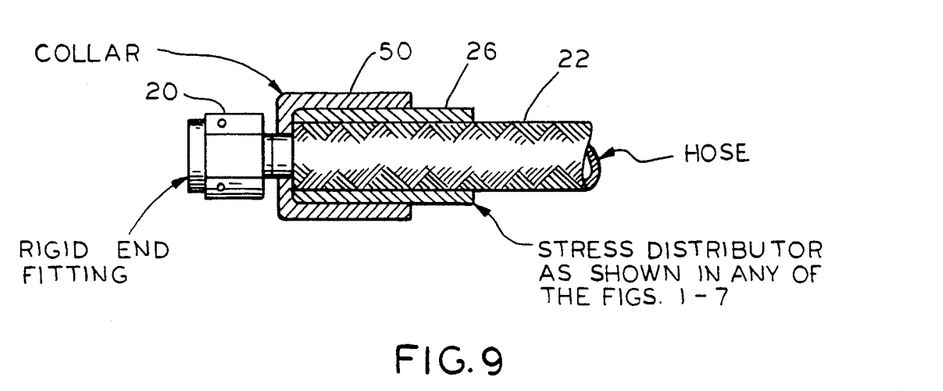
FIGS. 9 and 10 are side elevations of any embodiment similar to the embodiment of FIGS. 1-7 with an added metal end cap in order to create a superior mechanical joint.
Figure 10:
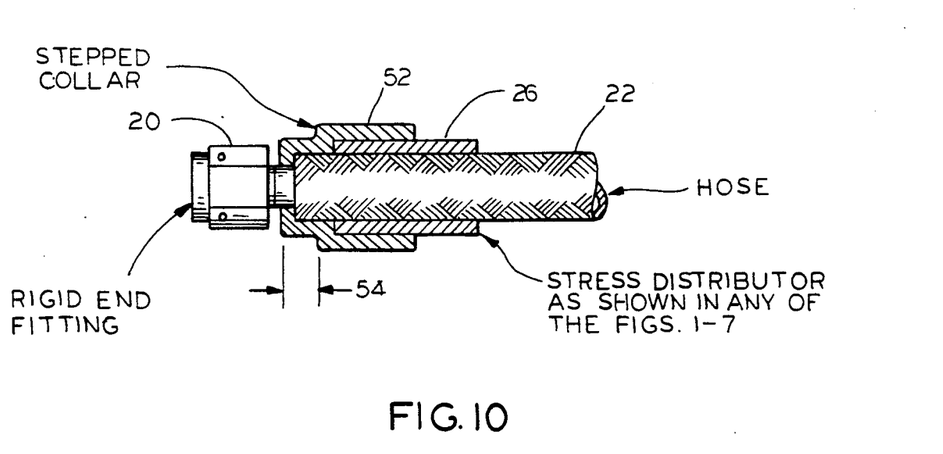

FIGS. 9, 10 generically show how a rigid collar may be added to the stress distributor of any of the FIGS. 1-7. However, for convenience of description, the collar will be described in reference to FIG. 1, it being understood that this description is applicable to all FIGS. 1-7.

Therefore, in order to immobilize the stress distributor at the point of this maximum bending, a rigid collar 50 (FIG. 9) is slipped over the stress relief member 26 and anchored to or made integral with the end fitting 20. This embodiment does not have the rigid insert which terminates at line 24. This means that the braid between the stress relief member 26 and the hose does not experience any local bending under the collar. The stress relief member 26 is still able to provide the stress relief described above in connection with FIGS. 1-3.

In FIG. 10, the principle is the same except that collar 52 is stepped so that, at 54, the end of the hose 22 itself is gripped. This grip provides a function similar to that of the clamp 30 in FIG. 2.

The advantages of FIGS. 9, 10 are that the cost of the outer collar is lower. The assembly of the structure is easier and quicker. There are fewer parts to make or assemble. The quality control inspection is improved, easier and more reliable. The outer collar transfers only the stress required to make a mechanical joint, as distinguished from the stress of stretching over the rigid insert plus the mechanical joint.

When the various embodiments were subject to Department of Transportation ("DOT") whip-testing, the outer collar of FIGS. 9, 10 generated much less heat than was generated by the embodiments (FIGS. 1-7) with the insert. Also, under the DOT whip-testing the embodiments using the outer collar of FIGS. 9, 10 bent much more smoothly than the embodiments using the rigid insert.

While the outer collar is shown only in connection with the FIG. 1 embodiment, it should be understood that it is applicable to all of the embodiments of FIGS. 1-7.

An advantage of the inventive stress distributor, as compared to other types of stress reliever, is that the inventive device protects against high frequency, high cycle, reversing linear or rotary flexing which can lead to tremendous fatigue and hysteresis loss which is not seen in "one-time-bend" hoses such as gasoline pump hoses, electric cords/plugs, etc. Hence, the invention can be described as a "dynamic stress reliever".

The invention is specifically designed to provide dynamic stress relief for a conduit. Consider the needs for stress relief on the power cord of an iron, for example. Conventionally, it has a rubber jacket extending from the iron over a few inches of the power cord in order to distribute bending forces which may occur in the power cord while the iron is in use. However, in use, the iron is moving rather slowly over a very smooth surface of an ironing board. For all practical purposes, the iron is a static, non-moving device. The stress upon the power cord is relatively limited, as contrasted to the stress upon a whipping conduit.

Figure 11:
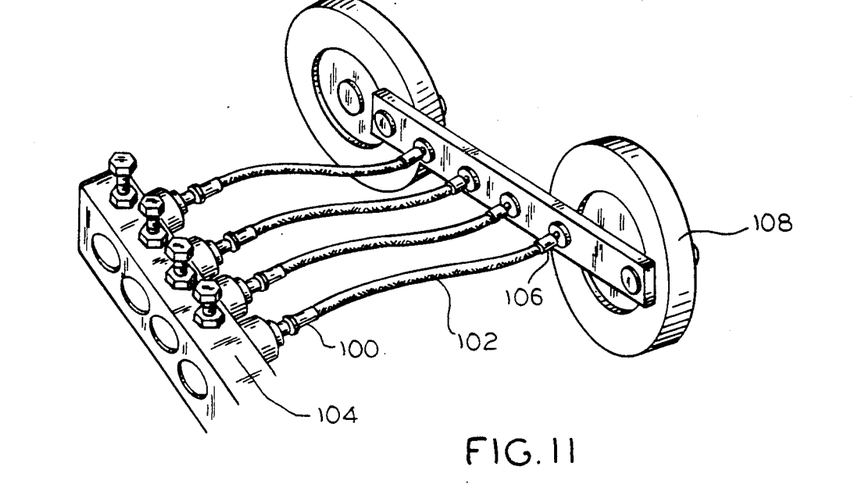
FIG. 11 is a perspective view of a whip-test machine devised by the U.S. Department of Transportation to test hydraulic brake line conduits which are subject to dynamic flexing.

The U.S. government (Department of Transportation) has devised a "whip-test" machine (FIG. 11) for testing conduits used in automobile brake lines which is an example of a "kinetic hose". One end 100 of a hose 102 is attached to a stationary block 104. The other end 106 of hose 102 is attached to the outer edge of an 8-inch diameter flywheel 108. The flywheel is then rotated at 800 R.P.M. The hose 102 cannot fail in any way before 35 hours have passed with the flywheel rotating continuously. This is a high dynamic stress system which may be used to give a kinetic hose a pass/fail test.

The whip-test (FIG. 11) was devised to provide standards for auto safety. Wheels and brakes suffer large displacement and high frequency vibration especially when going over rough sections of road. Considerable stress is added when the wheels are turned to go around a corner. Repeated torque is added if the brakes are fully activated.

Figure 12:
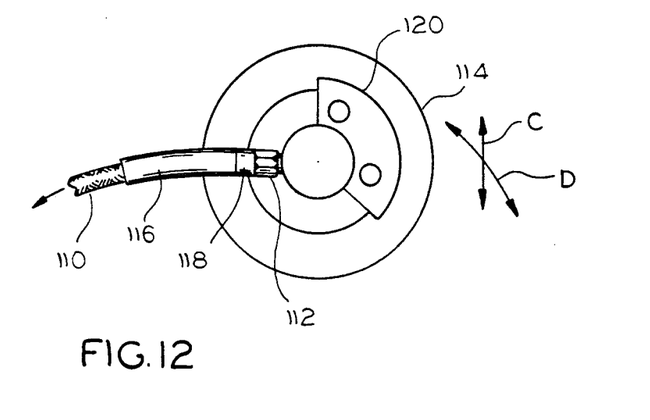
FIG. 12 is a representation of a brake line connected to a front wheel of an automobile.

The application of a "whip-test" graduate hose to a front wheel of an automobile is shown in FIG. 12. A conduit is attached to a front auto wheel 114 by means of a nut 112. The inventive stress distributor 116 extends from a collar 118 up the brake line conduit 110. The auto wheel 114 is subjected to vertical motion C by road bumps, wheel bounce, body bounce, etc. In addition, an arcuate rotation D occurs in the brake line conduit as the brakes 120 are applied and released. The steering of the auto also causes a rotation (not shown) perpendicular to motion C caused by the roadway. Hence, the brake line 110 experiences many unpredictable flexing movements, to say nothing of occasional strikes by flying stones or the like.

Another example of a dynamic setting for a conduit is found on the hydraulic pumps mounted on construction vehicles which suffer large vibration displacements when operating. The hydraulic cylinders are connected to move mounted linkages, adding more stress to the hose. Conventional swivel elbow fittings tend to wear and allow the hydraulic hose to leak. Fixed elbows tend to unscrew themselves under dynamic stress. The stress distributor is a good solution as a long-life replacement for these elbows which have been used in the past.

Figure 13:
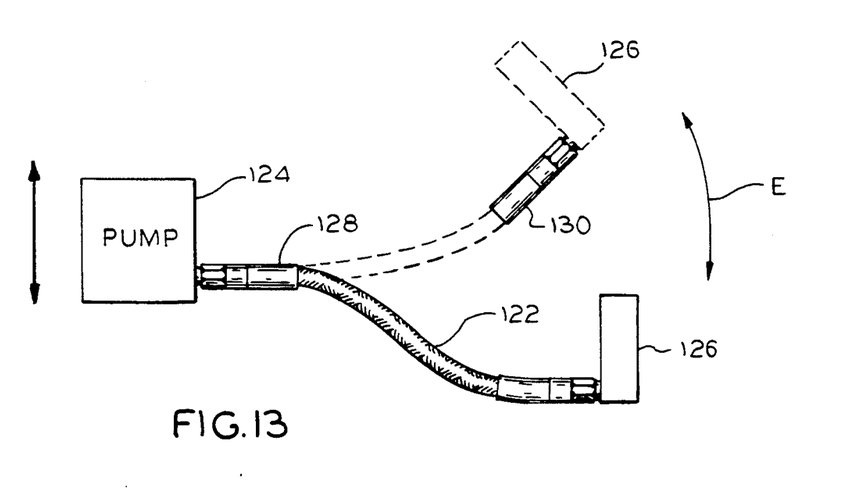

More particularly, as shown in FIG. 13, a hydraulic line hose 122 is coupled between a fixed object such as pump 124 and a movable cylinder 126. For example, a hydraulic ram-operated derrick may be mounted on the front of a very large flat bed truck in order to lift heavy loads onto or off the truck. A bulldozer may have hydraulic rams to control, lift, and move an earth-moving blade, etc. Every time that the hydraulic ram moves, the hose 122 must flex, as indicated by the arrow E. Of course, many other freedoms of motion may occur to cause different degrees of flexing in the hose 122. Here, the inventive stress distributor is used at 128, 130 on both ends of the hose 122.

Figure 14:
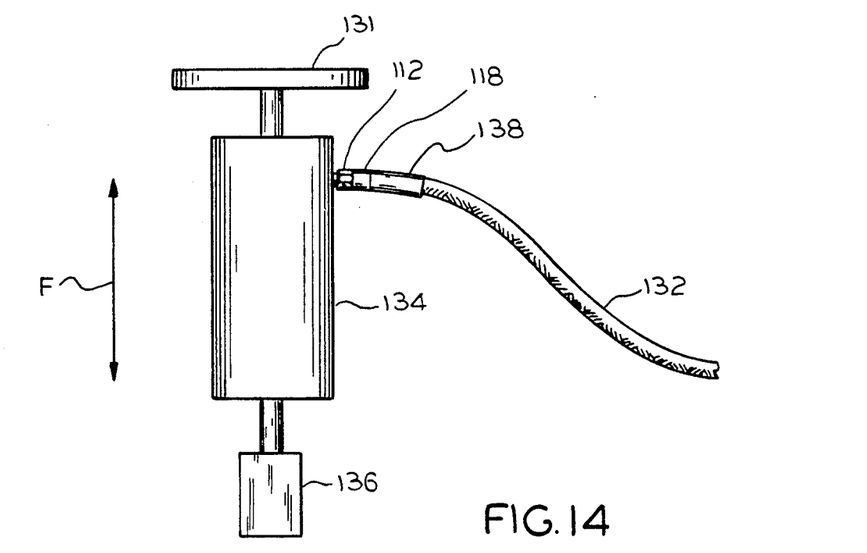
FIG. 14 is a representation of a compressed air line coupled to a jack hammer.

Still another example of a use of a kinetic hose in a dynamic environment in which the invention may be used is provided by FIG. 14, which shows a jackhammer. When properly operated, the handle 131 (where the operator holds the jackhammer) does not move. Everything else does, including the pressure cylinder where the air-feed hose is attached, with motion in almost any conceivable direction.

Here a hose 132 is connected to supply compressed air to the jackhammer 134. The jackhammer contains a reciprocally moving sledge which repeatedly pounds a blade in directions F. The inventive stress distributor 138 surrounds the air line 13 at the location where it connects to the jackhammer 134.

Figure 15:
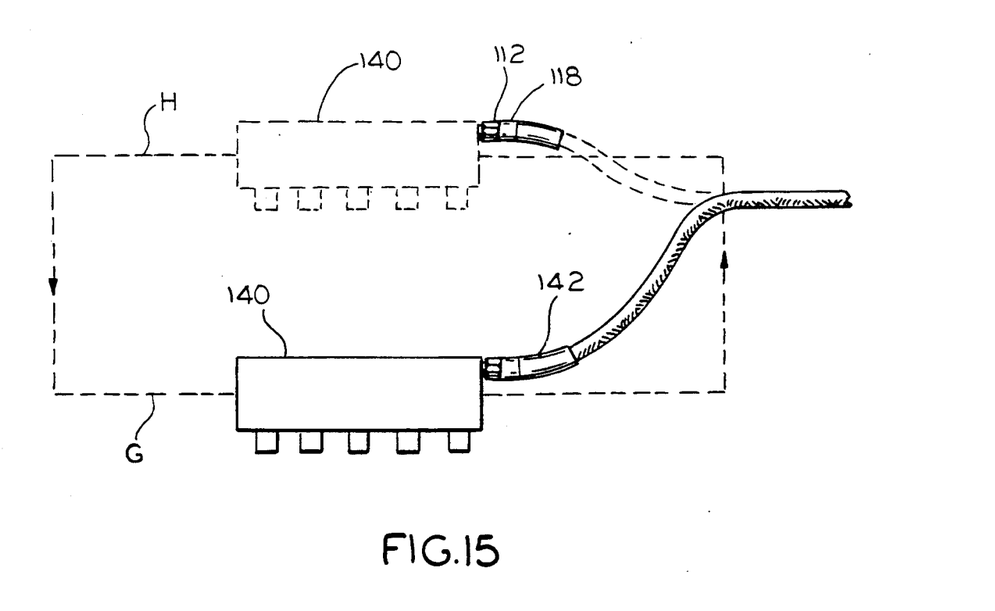
FIG. 15 is a representation of a fluid delivery line to a high-speed bottle filling machine.

FIG. 15 shows yet another example of a dynamic condition where a hose may profit from a use of the inventive stress distributor. This is an automated, high-speed bottling machine of the type which can be found in factories that produce bottled drinks in high volume. A dispenser 140 is lowered onto the tops of bottles, on a conveyor line. The dispenser moves along path G (shown by dashed lines) down the conveyor line with the bottles as it fills them. After having filled the bottles, the dispenser is then raised above the now full bottles and moves along path H to a position over the next set of bottles to be filled. The entire cycle takes less than a second. The hose providing fluid to the dispenser is whipped about by both the motion and the pressure pulses inside it as the fluid delivery is switched on and off. This motion continues all day long—and sometimes twenty-four hours a day—at least six days a week. Hence, the inventive stress distributor 142 undergoes a motion which is quite similar to the DOT whip-test described above in connection with FIG. 11.

These examples of dynamic flexing can be multiplied. The point is that it is much more difficult to provide dynamic stress relief than it is to provide static relief. Moreover, it is much more difficult to accommodate a hose which may kink as it whips around as compared to the difficulty of accommodating a solid electric wire, for example, which is not subject to kinking and which would suffer little or no ill effects from an equivalent to kinking.

The appended claims are to be construed to cover all equivalent structures and are not to be construed as necessarily limited to the specific structures described herein.

I claim:

1. A dynamic stress relief device for a substantially non-metal kinetic, large displacement, high frequency flexing hose, said device comprising an end fitting having an insert section and an outer collar associated therewith; a highly flexible substantially non-metal hose made primarily of an elastomer material, said insert section fitting into said hose and making it rigid in the area of said insert, said hose also fitting into, surrounded by, and secured to said outer collar; a flexible sleeve fitting over the rigid area adjacent said insert and extending out over said highly flexible kinetic hose, said flexible sleeve providing a progressively greater flexibility extending from a minimum flexibility near said end fitting and in said rigid area to a maximum flexibility remote from said end fitting whereby said hose is bendable without either kinking or experiencing undue localized fatigue; a portion of said sleeve adjacent said end fitting being fitted into and surrounded by said collar, over and surrounding said hose, and extending from said end fitting outwardly over said hose for a distance which is in a range of not less than three times the outside diameter of said hose and not more than twenty times.

2. The stress relief device of claim 1 wherein said progressively greater flexibility is defined by a combined spring moment density (S) described by the equation $$S = K(A_T)/L_T^3$$

where:

K = a local transverse spring constant $A_T$ = a section area of the hose (i.e. the area bounded by the outside diameter less the area bounded by the inside diameter)

$L_T$ = an active length of the stress relief distributor wherein:

(1) at a length of one hose diameter from a fixed end, the spring moment density S calculated by said equation is within a range of approximately 4 and 38;

(2) at a length of two hose diameters from a fixed end, the spring moment density S calculated by said equation is within a range of approximately 1 and 10; and (3) at a length of three hose diameters from a fixed end, the spring moment density S calculated by said equation is within a range of approximately $\frac{1}{2}$ and 3.

3. The stress relief device of claim 1 wherein said progressively greater flexibility is defined by a combined spring moment density which falls within the range $S_{MIN}$ and $S_{MAX}$ as described by the graph of FIG. 8.

4. The stress relief device of either one of the claims 2 or 3 wherein said progressively greater flexibility is an analog function.

5. The stress relief device of either one of the claims 2 or 3 wherein said progressively greater flexibility is a digital function.

6. The stress relief device of either one of the claims 2 or 3 wherein said sleeve is a co-axial series of progressively shorter sleeves extending from said end fitting over said hose, the longest of said progressively shorter sleeves being nearest the surface of said hose, the shortest of said sleeves being the most remote from said surface of said hose, with any intermediate sleeves being arranged in the order of their length.

7. The stress relief device of either one of the claims 2 or 3 wherein said sleeve has a tapered cross-section.

8. The stress relief device of either one of the claims 2 or 3 wherein said sleeve has a plurality of perforations distributed to give said progressively greater flexibility toward the remote end of the fitting.

9. The stress relief device of either one of the claims 2 or 3 wherein said sleeve comprises a combination of retainer rings joined by leaf springs extending from said end fitting over a surface of said hose for said distance, said leaf springs being parallel to an axis of said hose.

10. The stress relief device of either one of the claims 2 or 3 wherein said sleeve is a contiguous series of elastomer rings threaded over said hose and extending for said distance from said end fitting, said progressively greater flexibility occurring by varying at least one of the diameter thickness, and durometer of said rings.

11. The stress relief device of either claim 2 or claim 3 wherein said hose is a flexible hydraulic conduit extending from a structure mounted on the body of a vehicle to a brake on a wheel of said vehicle.

12. The dynamic stress relief device of claim 1 wherein said sleeve comprises at least one substantially elastomer sleeve on said hose and extending from said end fitting outwardly over a limited distance along the length of said hose; said sleeve having a plurality of perforations distributed over said sleeve in a manner which gives said sleeve a progressively greater flexibility from greater rigidity near the end fitting to greater flexibility toward the outer end of said sleeve; a second elastomer sleeve fitting over said perforated sleeve; and said greater flexibility occurring by changes in the spring moment density along the lengths of said sleeves.

13. The stress relief device of claim 12 wherein said second sleeve is an overlying sleeve extending less than said limited distance along the length of said hose for increasing the rigidity of the perforated sleeve near the end fitting and with the rigidity of said sleeve increasing in a direction toward said end fitting.

14. A dynamic stress relief device in combination with a substantially non-metal kinetic hose made of an elastomer and having an end fitting, said combined hose and stress relief device withstanding continuous large displacement bending at high frequencies; said end fitting having a part inserted into said hose to provide a rigid section followed by a flexible section which must withstand said large displacement, high frequency bending without fatigue at a junction between said rigid and flexible sections, said stress relief device fitting over said junction between said rigid and flexible sections; said end fitting further comprising an outer collar for receiving, circumferentially surrounding, and anchoring said hose in place, a portion of said stress relief device being fitted into and surrounded by said collar; said stress relief device comprising at least two progressively shorter sleeves of elastomer material fitted over said hose and the sleeves throughout their lengths; each of said sleeves extending from said end fitting outwardly over limited distances along the length of said hose; the sleeves being arranged in an order of their length with the longest sleeve being closest to the outer surface of the hose and the shortest sleeve being furthest from the outer surface of said hose; said sleeves cooperating to give a combined resilience wherein said hose bends with a progressively greater rigidity as the distance decreases along said hose toward said end fitting.

15. The stress relief device of claim 14 wherein the thickness and durometer of each of said sleeves is selected to control the overall flexibility of the stress relief device.

16. A dynamic stress relief device for an elastomer hose having an end fitting thereon, said end fitting having a collar rigidly associated therewith, said device comprising at least two progressively shorter sleeves of elastomer material fitted over said hose for controlling the combined spring moment density of the sleeve throughout its length, each of said sleeves extending from said end fitting outwardly over limited distances along the length of said hose, the sleeves being arranged in an order of their length with the longest sleeve being closest to the outer surface of the hose and the shortest sleeve being furthest from the outer surface of said hose, said shortest sleeve being fitted inside of and attached to said collar, and selectively positioned bonding between said sleeves for producing selective flexing qualities for said stress relief device.

17. A system for delivering fluids under dynamic stress conditions, said system comprising a substantially elastomer kinetic hose which experiences extensive large scale vibrations and motions in many different directions which occur at high frequencies, said hose having adjoining rigid and flexible sections whereby a maximum material fatigue would occur at a junction between said rigid and flexible sections; a stress distributor means comprising a sleeve fitting over said hose, into and anchored by a collar surrounding the rigid section; said elastomer hose comprising means for delivering a fluid to a moving mechanical part throughout said vibration and motion whereby said hose is whipped about by vibration and motion of said part, said stress distributor means anchored on at least one end to said part and surrounding said junction between said sections and extending for a predetermined distance from said rigid section over said hose, said stress distributor means comprising a flexible sleeve lying over and surrounding said hose and having a progressively greater flexibility extending from the rigid section to a relatively great flexibility at an opposite end of said distance.

18. The system of claim 17 wherein said hose is a hydraulic line.

19. The system of claim 18 wherein said hydraulic line is part of an automotive brake line.

20. The system of claim 17 wherein said hose is a compressed air line.

21. The system of claim 17 wherein said hose is part of a machine for delivering fluid to said mechanical part in pressure pulses.

22. A stress relief device for a hose having an end fitting thereon, said device comprising at least two progressively shorter sleeves of elastomer material fitted over said hose for controlling the combined spring moment density of the device throughout its length, each of said sleeves extending from said end fitting outwardly over limited distances along the length of said hose, the sleeves being arranged in an order of their length with the longest sleeve closest to the outer surface of the hose and the shortest sleeve furthest from the outer surface of said hose, and selectively positioned bonding between said sleeves for producing selective flexing qualities for said stress relief device.

* * * * *

UNITED STATES PATENT AND TRADEMARK OFFICE
CERTIFICATE OF CORRECTION

PATENT NO. : 5,143,409
DATED : September 1, 1992
INVENTOR(S) : Anthony J. Lalikos It is certified that error appears in the above-identified patent and that said Letters Patent is hereby corrected as shown below:

In The Drawings:
In FIG. 8, the formula $S_{MIN}$ should read as follows:

$$--S_{MIN} = 9.21 - (7.80D) + (2.52D^2) - (.358D^3) + (.019D^4)--$$

Signed and Sealed this

Eleventh Day of April, 1995

Attest:

*Attesting Officer*

BRUCE LEHMAN

*Commissioner of Patents and Trademarks*